United States Patent [19]

Bell

[11] 4,381,881
[45] May 3, 1983

[54] FIBER OPTIC CROSSBAR SWITCH FOR AUTOMATICALLY PATCHING OPTICAL SIGNALS

[75] Inventor: Charles H. Bell, Merritt Island, Fla.

[73] Assignee: The United States of America as represented by the Administrator of the National Aeronautics and Space Administration, Washington, D.C.

[21] Appl. No.: 153,245

[22] Filed: May 27, 1980

[51] Int. Cl.$^3$ ............................................. G02B 5/14
[52] U.S. Cl. ................................. 350/96.16; 455/612
[58] Field of Search .................... 350/96.16; 250/227; 455/610, 612

[56] References Cited

U.S. PATENT DOCUMENTS 3,360,657 12/1967 Shlesinger, Jr. ..................... 250/227

FOREIGN PATENT DOCUMENTS

| 54-38147 | 3/1979 | Japan | 350/96.16 |
| 54-122134 | 9/1979 | Japan | 350/96.15 |
| 54-156552 | 12/1979 | Japan | 350/96.16 |
| 55-22723 | 2/1980 | Japan | 350/96.15 |
| 55-155302 | 12/1980 | Japan | 350/96.16 |
| 55-156902 | 12/1980 | Japan | 350/96.16 |

OTHER PUBLICATIONS

NASA Tech Briefs, vol. 4, No. 1, Spring 1979, p. 8, Charles H. Bell, "Fiber Optic Crossbar Switch".

Primary Examiner—John D. Lee
Assistant Examiner—Frank González
Attorney, Agent, or Firm—James O. Harrell; John R. Manning

[57] ABSTRACT

A system for automatically optically switching fiber optic data signals between a plurality of input optical fibers (10, 11, 12, 13) and selective ones of a plurality of output fibers (56, 56a, 56b, 56c). The system includes optical detectors (14, 16, 18, 20) which are connected to each of the input fibers (10, 11, 12, 13) for converting the optic data signals appearing at the respective input fibers to an RF signal. A plurality of RF to optical signal converters (38, 40, 42, 44a, etc.) are arranged in rows and columns. The output of each of the optical detectors (14, 16, 18 and 20) are each applied to a respective row of optical signal converters (38, 40, 42, 44, etc.) for being converted back to an optical signal when the particular optical signal converter is selectively activated by a DC voltage. These optical signals are then applied via optical fibers (62) to optical detectors (58) which convert the optical signal back to an RF signal which is used for driving the ILDs (60). The ILDs (60), in turn, convert the RF signals back to optical signals without any mechanical switching either of the optical signals or the RF signals. The output fibers are connected to the output of the driving ILDs (60).

8 Claims, 4 Drawing Figures 4,381,881

FIBER OPTIC CROSSBAR SWITCH FOR AUTOMATICALLY PATCHING OPTICAL SIGNALS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

One problem with switching arrangements heretofore utilized is that they normally use mechanical connectors or switching elements that required contacts that after a period of time malfunctions develop in the switching of the signals due to worn contacts or possible contamination of the contacts. Since the development or growth of fiber optics, fiber optic switching arrangements have been utilized which require the individual fibers between which switching takes place to be accurately and precisely aligned so as to transfer the light signal from one fiber to the other. While these devices work satisfactorily when all of the fibers are in optical alignment, it is extremely difficult to align the fibers so as to transfer optical signals therebetween. Furthermore, the transfer of the signal is hindered when the ends of the fibers are not cleaned or contaminated with grease or other contaminants.

It is extremely difficult to maintain the proper and precise mechanical alignment between the fibers in a purely fiber mechanical switching device.

SUMMARY OF THE INVENTION

A system for automatically optically switching fiber optic data signals between a plurality of input optical fibers and selective ones of a plurality of output optical fibers. The system includes an optical fiber detector means which is connected to each of the input fibers for converting the optical data signal appearing at a respective input fiber to an RF signal. A plurality of RF to optical signal converters are arranged in the form of a matrix in rows and columns. The output of each of the optical detector means is connected to the input of each of the RF to optical signal converters in a respective row of the matrix.

Means is provided for selectively applying D.C. power to the RF to optical signal converters for causing any RF signal appearing at the input thereof to be converted to an optical signal. The particular RF to optical signal converter that the D.C. power is applied to is under control in one particular embodiment of the thumbwheel switches.

The output of the RF to optical signal converters is connected to the output fibers by means of optical detectors and an optical transmitter.

The entire system is encased in a gold anodized machined aluminum housing so as to minimize cross-talk between respective optical fiber lines. The housing is divided into channels for receiving the optical detector means and the various other components. Supply voltages and switching logic lines all pass through RF isolaters prior to entering the optical transmitter cavity.

Accordingly, it is an important object of the present invention to provide a fiber optic crossbar switch for automatically patching optical signals from a plurality of input fibers to a plurality of output fibers.

Still another important object of the present invention is to provide a fiber optic crossbar switching device wherein alignment between fiber ends is not required since the optical signals are converted from an optical signal to an electrical signal and back to an optical signal.

Another important object of the present invention is to provide a fiber optic crossbar switch wherein optical signals are converted to RF signals and by selectively energizing LEDs to which the RF signals are patched, the RF signals are converted back to optical signals by the LEDs and fed through optical fibers to predetermined outputs.

Still another important object is to provide a system for switching optic signals from a plurality of input fibers to selective output fibers utilizing external DC power for activating the switching.

These and other objects and advantages of the invention will become apparent upon reference to the following specification, attendant claims and drawings.

DESCRIPTION OF A PREFERRED EMBODIMENT

Figure 1:
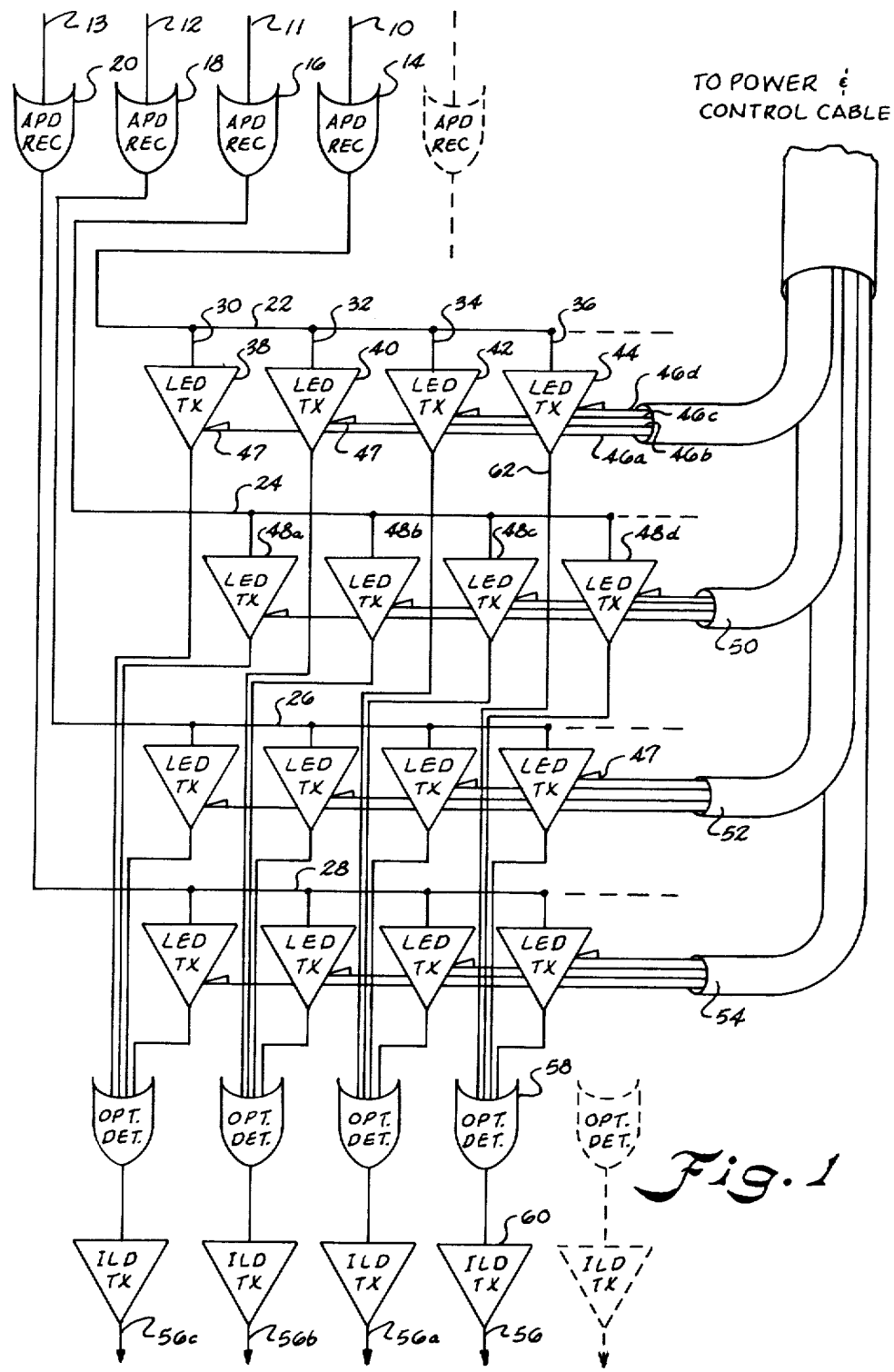
FIG. 1 illustrates schematically a fiber optic crossbar switch constructed in accordance with the present invention.

Referring to FIG. 1, there are a plurality of fiber optic signals fed to input fibers 10, 11, 12 and 13 in parallel to respective receiver modules 14, 16, 18 and 20. The receiver modules 14–20 are avalanche photodetectors which convert the optical signals being applied to the inputs thereof to RF signals. The output of each of the receiver modules 14–20 are connected to respective RF distribution buses 22, 24, 26 and 28. The RF distribution bus 22, in turn, feeds the RF signal in parallel to the inputs 30, 32, 34 and 36 of respective light emitting diodes 38, 40, 42 and 44.

The light emitting diodes 38–44 are activated by a DC control voltage coming in on leads 46a through 46d. Interposed in each of the leads 46a through 46d is a driver 47 for driving the light emitting diode connected thereto.

Similarly, the light emitting diodes 48a, 48b, 48c and 48d are activated by DC voltages from the leads being fed through the multiconductor cable 50. A multiconductor cable 52 is used for activating the light emitting diodes in the third row and a multiconductor cable 54 is utilized for activating the light emitting diodes provided in the fourth row.

Assuming that it is desired to connect the input appearing on input fiber 10 to an output fiber 56, then a DC signal would be applied to conductor 46d for activating light emitting diode 44. This causes the RF signal being applied on input lead 36 of the light emitting diode 44 to be converted to an optical signal and transmitted to optical detector 58 via optical fiber 62.

The optical detector 58 is used for driving an ILD (injection laser diode) transmitter module 60 and for converging the optical signal appearing on the output of LED 44 to an RF signal.

In other words, the light emitting diode 44 converts the RF signal appearing on bus 22 to an optical signal which is fed by means of a fiber 62 to the input of the optical detector 48. The optical detector 58 converts the optical signal back into an RF signal which is used for driving the ILD 60. The ILD 60, in turn, converts the RF signal back to optical signal without any mechanical switching either of the optical signal or the RF signal. It is noted that the coupling of the optical signals appearing on the input fibers 10 through 13 is controlled by the signals appearing on the multiconductor cables 46, 50, 52 and 54. The multiconductor cables, in turn, energize through the drivers 47 one of the respective light emitting diodes shown in the matrix in FIG. 1.

In order to achieve a high degree of isolation between the input terminals and the output terminals, the light emitting diodes shown in FIG. 1 are positioned in channels 64, 66, 68 and 70 carried in gold anodized machined aluminum housings. The respective light emitting diodes 38, 40, 42 and 44 are carried within the channel 64. Each of the channels 64 through 70 have dividers 72 positioned therebetween which extend to the top of a goldplated aluminum housing. The purpose is to contain any one input that would appear on input terminals 10, 11, 12 and 13 within a respective channel 64 through 70 for isolation purposes. It is noted that isolation capacitors 74 extend through a side wall 76 through which the DC power is connected from the cables 46 through 54 to the respective light emitting diodes carried within the matrix. The output fibers are contained in the terminals shown at the bottom of the box and labeled 56, 56a, 56b and 56c. The output terminals 56, 56a, 56b and 56c are also contained within channels running perpendicular to the channels 64 through 70. Each output 56 through 56c has its own respective channel 78a, 78b, 78c and 78d. Connection between the upper portion of the housing is provided through fibers extending from the upper portion of the housing shown in FIG. 2 to the lower portion of the housing shown in FIG. 3.

Power is supplied to the optical detectors 58 and the ILDs 60 through capacitors 80 which are, in turn, connected by leads not shown to a power connector 82.

Figure 2:
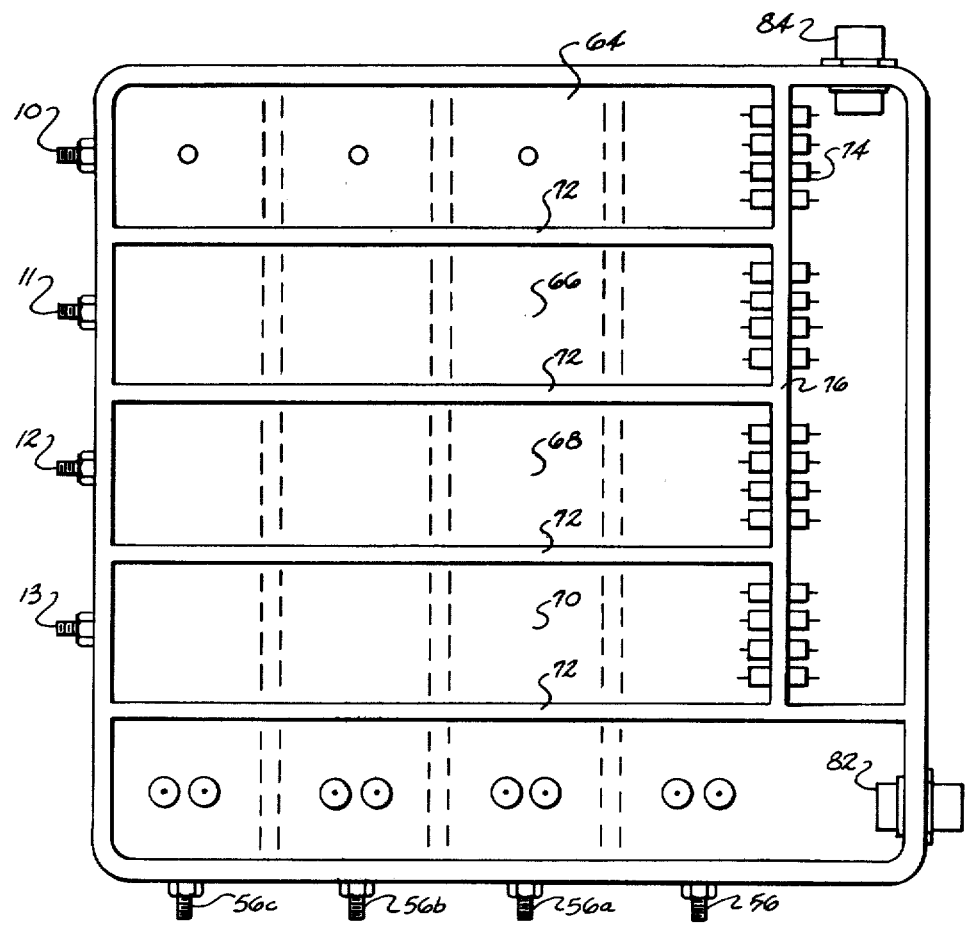
FIG. 2 is a plan view illustrating an isolation box in which the switching arrangement is located.
Figure 3:
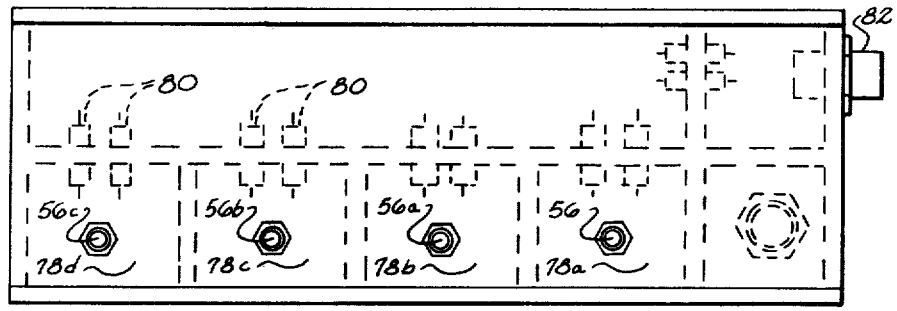
FIG. 3 is a side elevational view of the isolation box shown in FIG. 2.

A similar control connector 84 is provided for all of the isolating capacitors 74 as shown in FIG. 2.

Figure 4:
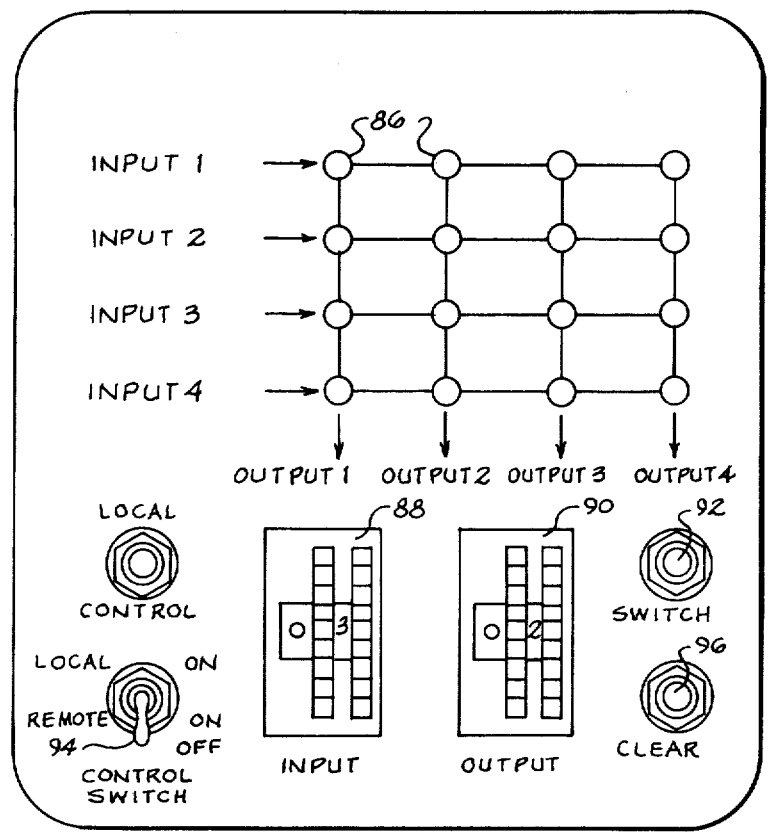
FIG. 4 is a plan view illustrating a local control panel for switching the fiber optic signals from predetermined inputs to predetermined outputs.

Referring to FIG. 4 of the drawings, there is illustrated a matrix that includes lamps 86, each of which is associated with a particular LED such as LED 38 shown in FIG. 1. The lamps 86 correspond to the driving signals that are supplied to the LEDs shown in FIG. 1 to indicate the particular patching arrangement that has taken place.

The patching is controlled manually by a pair of thumbwheel switches 88 and 90.

When an operator wants to patch a particular fiber optic signal appearing at one of the input terminals to a particular output fiber, he merely dials in the respective fibers on the thumbwheel switch 88 and 90. The thumbwheel switch 88 is provided for identifying the particular input terminal and thumbwheel switch 90 is provided for identifying the particular output terminal.

A memory can be associated with the fiber optic crossbar switch and if such is incorporated and it is desired to control the switching through a memory unit, then the operator merely depresses a switch 92 which causes the particular selection made on thumbwheel switches 88 and 90 to be stored in memory for subsequent use.

Normally, in operation, the operator first selects the particular switching pattern by the thumbwheel switches 88 and 90. After he has selected the switching pattern, he depresses the switch 92 which causes this particular pattern to be stored in a memory. If he desires to patch in a plurality of connections, then he would perform this function for each of the particular patching paths and each time he would depress the switch 92 to store this particular patching configuration in the memory. A local control switch 94 is provided for either switching by manual switching connection or computer control. In the manual operation, the operator utilizes the thumbwheel switches and if it goes to computer, he uses a data bus which the crossbar switch would recognize. A clear button 96 is also provided for clearing all of the patching previously made for the matrix in the manual mode. During computer control, clear is accomplished via the data bus.

Also shown in FIG. 4 is a local control switch which permits you to either control from this panel or to go remote which would then permit a computer data bus type control on the crossbar switch. If you are in the local control, a local control light is illuminated indicating that you are able to use the manual switching arrangement.

While a preferred embodiment of the invention has been described using specific terms, such description is for illustrative purposes only, and it is to be understood that changes and variations may be made without departing from the spirit or scope of the following claims.

What is claimed is:

1. A system for automatically optically switching fiber optic data signals between a plurality of input optical fibers and selective ones of a plurality of output optical fibers comprising:
   (a) an optical detector means connected to each of said input fibers for converting said optic data signal appearing at said respective input fibers to an RF signal;
   (b) a plurality of RF to optical signal converters arranged in a plurality of rows and columns;
   (c) the output of each of said optical detector means being connected to the input of each of said RF to optical signal converters in a respective row of said optical signal converters;
   (d) means for selectively activating said RF to optical signal converters causing any RF signal appearing at the input thereof to be converted to an optical signal; and
   (e) means connected to predetermined outputs of said RF to optical signal converters for supplying said optical signals from said RF to optical signal converters to predetermined ones of said output optical fibers.

2. The system as set forth in claim 1 further comprising:
   (a) said means for selectively activating said RF to optical signal converters including,
      (i) a source of DC power, and
      (ii) means for selectively applying said DC power to said RF to optical converters.

3. The system as set forth in claim 2 further comprising:
   (a) said means for selectively applying said DC power to said RF to optical converter including, (i) at least one manually operable thumbwheel switch.

4. The system as set forth in claim 1 further comprising:
(a) said means connected to predetermined outputs of said RF to optical signal converters including,
  (i) optical fibers connected to each of the outputs of said RF to optical signal converters,
  (ii) an optical detector connected to the optical fibers extending from the outputs of each of said RF signal to optical signal converters in a respective column of said optical signal converters,
  (iii) an optical transmitter connected to the output of each of said optical detectors in turn driving a respective output fiber.

5. The system as set forth in claim 1 further comprising:
(a) said RF to optical converters being light-emitting diodes.

6. The system as set forth in claim 1 further comprising:
(a) said optical detector means including an avalanche photodetector.

7. The system as set forth in claim 1 further comprising:
(a) metallic housing means encasing said system for minimizing cross-talk between said optical fiber lines;
(b) said housing being divided into a top portion and a bottom portion separated by a metallic planar divider;
(c) a plurality of spaced divider plates carried in said top portion of said housing dividing said top portion into isolated channels;
(d) a plurality of spaced divider plates carried in said bottom portion of said housing dividing said bottom portion of said housing into isolated channels;
(e) each of said rows of said optical signal converters being carried in a respective channel in said top portion of said housing; and
(f) said means supplying said optical signals from said RF to optical signal converters to predetermined ones of said output optical fibers being carried in respective isolated channels in said bottom portion of said housing.

8. A system for automatically optically switching fiber optic data signals between a plurality of input optical fibers and selective ones of a plurality of output optical fibers comprising:
(a) an optical detector means connected to each of said input fibers for converting said optic data signal appearing at said respective input fibers to an RF signal;
(b) a plurality of RF to optical signal converters arranged in a group;
(c) the output of each of said optical detector means being connected to the input of each of said RF to optical converters in a respective group of said optical signal converters;
(d) a source of DC power;
(e) means for selectively applying said DC power to selective ones of said RF to optical signal converters causing any RF signal appearing at the input thereof to be converted to an optical signal; and
(f) optical fiber means connected to predetermined outputs of said RF to optical signal converters for supplying said optical signals from said RF to optical signal converters to predetermined ones of said output optical fibers.

* * * * *